UNITED STATES PATENT OFFICE.

S. M. LOGAN, OF RICHMOND, INDIANA.

IMPROVED ROOFING COMPOSITION.

Specification forming part of Letters Patent No. 26,600, dated December 27, 1859.

*To all whom it may concern:*

Be it known that I, S. M. LOGAN, of Richmond, in the county of Wayne and State of Indiana, have invented certain new and useful Improvements in Compositions for Roofing Purposes; and I do hereby declare that the following is a full, clear, and exact description of the mode of making and of using said composition.

The following ingredients, compounded in the following proportions, constitute the nature of my invention: For every gallon of the composition I use copal varnish, two pints; japan-drier, one pint; eggs, seven, or one pint; lampblack, four and one-half ounces, or three pints, dry; yellow ocher, two pounds; common salt, one pint. These ingredients are mixed well together, and are used for spreading the first and second coats. The third coat is slightly changed from these proportions. In this coat the japan-drier is left out and a pint of salt is used in its stead. Eight eggs are also used to the gallon, instead of seven.

In using this composition I first spread a layer of it upon any cheap cotton or other cloth. I then turn the cloth over and spread it (the cloth) upon the sheathing of the roof, the composition being yet soft, and being next to the sheeting adheres to it, and thus holds the cloth fast. Another layer of composition is then placed upon the upper side of the cloth, and while this is yet soft another layer of cloth of the same kind is spread over the composition, to which it sticks fast. I then put another layer of composition upon the upper side of this last cloth. This layer is the third coat, and is prepared as before described. After this is done, and while the coat is still soft, sand may be sprinkled over it, if desirable.

The advantages of this composition are: It requires no heating to prepare it for use, it will not melt by ordinary heat, and will not freeze or crack.

I claim—

The within-described composition, constructed and used substantially as and for the purpose specified.

S. M. LOGAN.

Witnesses:
T. H. ALEXANDER,
H. S. OGDEN.